(12) United States Patent
Vemury

(10) Patent No.: US 10,885,364 B2
(45) Date of Patent: Jan. 5, 2021

(54) SYSTEM FOR CHARACTERIZATION OF BIOMETRIC STATION METRICS

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of the Homeland Security, Washington, DC (US)

( * ) Notice: Subject to any disclaimer, the term of this patent is extended or adjusted under 35 U.S.C. 154(b) by 68 days.

(21) Appl. No.: 16/366,226

(22) Filed: Mar. 27, 2019

(65) Prior Publication Data
US 2020/0110954 A1    Apr. 9, 2020

Related U.S. Application Data

(63) Continuation of application No. 16/150,773, filed on Oct. 3, 2018.

(51) Int. Cl.
*G06K 9/03* (2006.01)
*G06K 9/62* (2006.01)
*G06K 9/00* (2006.01)

(52) U.S. Cl.
CPC ......... *G06K 9/036* (2013.01); *G06K 9/00885* (2013.01); *G06K 9/6201* (2013.01); *G06K 9/0008* (2013.01)

(58) Field of Classification Search
None
See application file for complete search history.

(56) References Cited

U.S. PATENT DOCUMENTS

| | | | |
|---|---|---|---|
| 2001/0048025 A1* | 12/2001 | Shinn | G07C 9/257 235/382 |
| 2012/0189171 A1 | 7/2012 | Abiko et al. | |
| 2013/0275315 A1* | 10/2013 | Mergenthaler | H04L 63/0861 705/314 |
| 2017/0302661 A1 | 10/2017 | Connell, II et al. | |
| 2019/0392145 A1* | 12/2019 | Komogortsev | G06F 21/32 |
| 2020/0007536 A1 | 1/2020 | Piel | |

OTHER PUBLICATIONS

Verifiable Credentials Use Cases, W3C Working Group Note Sep. 24, 2019, https://www.w3.org/TR/2019/NOTE-vc-use-cases-20190924.

* cited by examiner

*Primary Examiner* — Leon Viet Q Nguyen
(74) *Attorney, Agent, or Firm* — Lavanya Ratnam; Kelly G. Hyndman

(57) ABSTRACT

Various example implementations of the present invention are directed towards systems and methods to quantify biometric acquisition and identification. A test facility evaluates the acquisition by a biometric station of biometric information. Evaluations can relate to biometric information acquisition speed, rates of acquisition failure, rates of biometric information extraction failure, rates of biometric match failure, calculating a true identification rate, and/or calculating other metrics related to quantifying biometric acquisition and identification. The test facility can calculate an efficiency metric and an effectiveness metric of the quantification determinations, and output such results.

6 Claims, 5 Drawing Sheets

SYSTEM FOR CHARACTERIZATION OF BIOMETRIC STATION METRICS

CROSS-REFERENCE TO RELATED APPLICATION

This application is a continuation of U.S. patent application Ser. No. 16/150,773, filed Oct. 3, 2018, the disclosure of which is incorporated by reference herein in its entirety.

STATEMENT OF GOVERNMENT INTEREST

The present invention was made by one or more employees of the United States Department of Homeland Security in the performance of official duties, and, thus the claimed invention may be manufactured, used, licensed by or for the United States without the payment of any royalties thereon.

FIELD

The present disclosure relates generally to the field of biometrics.

BACKGROUND

Biometric technologies may be unsuitable for many reasons, including inappropriate form factor, slow speed of acquisition, poor user satisfaction, failure to acquire or extract biometric information, and failure to match acquired biometric information. Due to recent improvements in biometric matching technology, failures to match have become a lower proportion of the total issues encountered with biometric systems. However, many systems still fail to quickly and reliably acquire biometric information. Failures to acquire can have a variety of causes, and frequently impact the speed of acquisition by necessitating repeated acquisition attempts. Unlike biometric algorithms for matching, which can be improved by leveraging existing datasets, failures to acquire are more challenging to address because no information is typically stored about non-collected images.

SUMMARY

Various example implementations of the present disclosure are directed towards systems and methods to quantify biometric acquisition and identification. An example method of quantifying biometric acquisition and identification includes evaluating a characterization score for an image or sample, relative to a characterization threshold, corresponding to whether the image or sample includes sufficient information to biometrically characterize a user represented in the image or sample. Biometric information for the user is derived from the image or sample. A biometric characterization of the user, relative to a characterization threshold, is generated based on the biometric information. It is determined whether the biometric characterization matches, to within a matching threshold, a sample or image contained in a gallery of biometric samples or images. An efficiency metric and an effectiveness metric of the determination are calculated, and a result of the determination is output.

In another example, a method of quantifying biometric acquisition includes determining if an image is sufficient for use in identification of a user represented in the image. Responsive to the determination that the image is sufficient, biometric information that is usable to identify the user to a predetermined threshold and exclude from identification other users is determined. Based on the biometric information, it is determined whether the user is represented in the gallery to the predetermined threshold. A result of the determination is output, and an acquisition quotient for the determination is calculated based on efficiency, effectiveness, and accuracy relative to time.

In yet another example, a method of quantifying biometric acquisition and identification of a user at a biometric station includes scanning a user identification of the user, to establish a ground truth identity of the user. A first timestamp is acquired, responsive to starting to acquire biometric information of the user at the biometric station. Biometric information of the user is acquired. A second timestamp is generated responsive to the acquisition. The biometric information, the first timestamp, and the second timestamp are stored in a backend. An average transaction time is determined for the user based on the first timestamp and the second timestamp. Identification results associated with the biometric information are determined, the identification results including at least one of acquisition speed of biometric image, failure to acquire biometric image (FtAR) relative to an FtAR threshold, failure to extract biometric information from image (FtPR) relative to an FtPR threshold, failure to perform a biometric match (FtMR) relative to an FtMR threshold, and True Identification Rate (TIR) as a percentage of correct identifications within the time interval between the first timestamp and the second timestamp. The identification results are stored on the backend. In embodiments, two or more arithmetic means of identification results are compared according to a two-sample, two-sided t-test to determine efficiency as a time-related metric based on the first timestamp and the second timestamp. Two or more proportions of identification results are compared according to a two-sample, two-sided proportion test to determine effectiveness as a time-related metric based on the first timestamp and the second timestamp.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more exemplary embodiments of the present invention are described in detail with reference to the following drawings. These drawings are provided to facilitate understanding of the present invention and should not be read as limiting the breadth, scope, or applicability thereof.

These drawings are not intended to be exhaustive or to limit the invention to the precise form(s) disclosed. It should be understood that the present disclosure can be practiced with modification and alteration, and that the invention is limited only by the claims and the equivalents thereof and the principles described in conjunction with one figured are combinable with that of the other figures.

DETAILED DESCRIPTION

Example implementations described herein enable evaluation of biometric acquisition and identification in a controlled environment. A test facility enables large-scale testing of biometric stations to determine the suitability of technology for various operational environments and use-cases. The test facility enables statistical analysis of user tests, designed to examine the efficiency, effectiveness, and acceptance of biometric systems incorporated into simulated operational use-cases by performing real-world testing on a diverse population of users.

Figure 1:
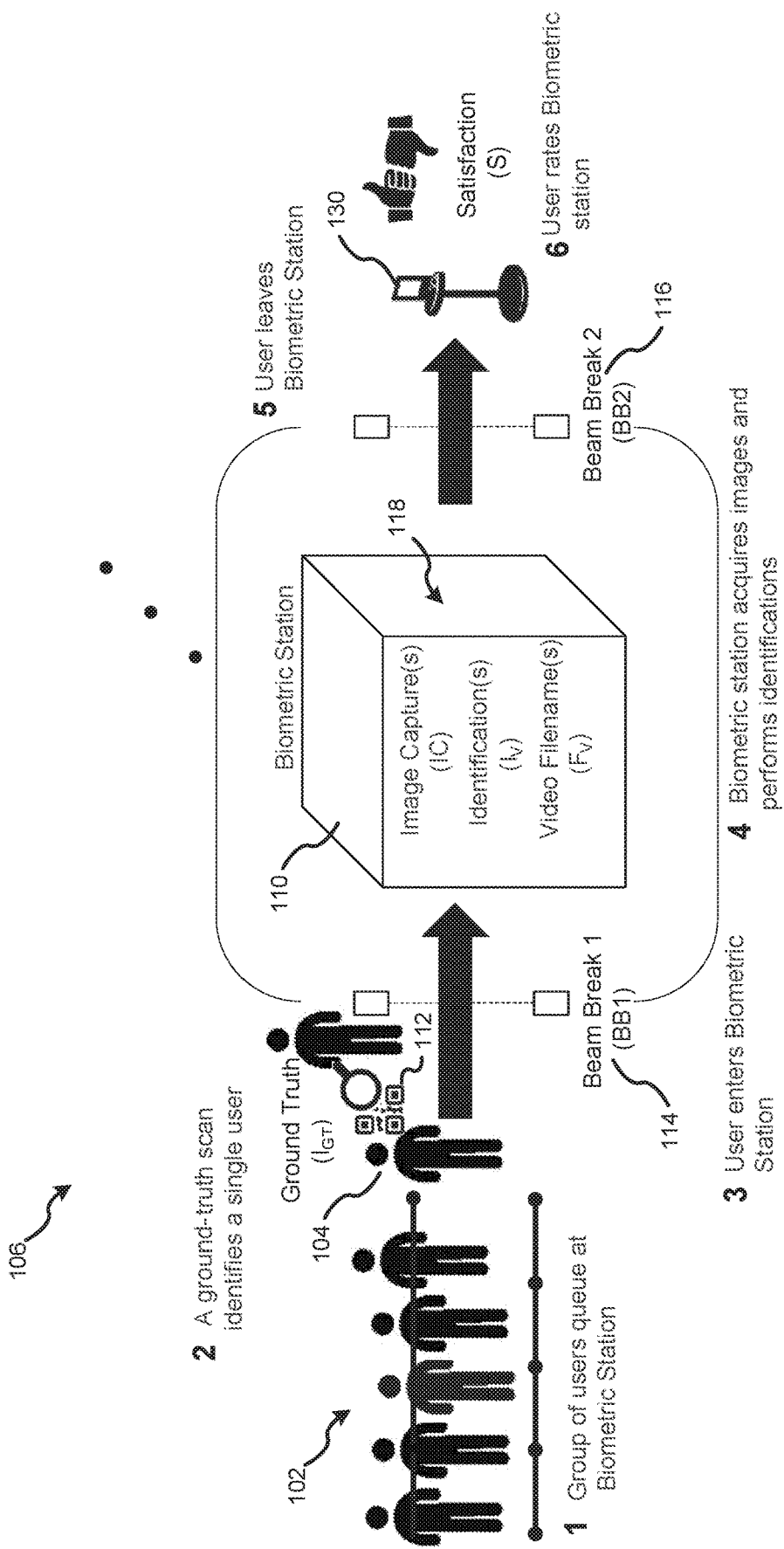
FIG. 1 illustrates biometric acquisition at a biometric station according to an implementation in accordance with this disclosure.

FIG. 1 illustrates biometric acquisition at a biometric station 110 according to an implementation. The biometric station 110 can be hosted at a test facility 106. In an implementation, the test facility 106 is a controlled environment that can support multiple biometric stations 110 for simultaneous operations and testing during a biometric testing event. The biometric station 110 is constructed to collect biometric information 118 from a user 104. Generally, a test session can involve the following activities: 1) a group 102 of users 104 queue at the biometric station 110; 2) a ground-truth scan is used to obtain a ground truth 112 identity of the user 104; 3) the user 104 enters the biometric station 110 and triggers a first beam break 114; 4) the biometric station 110 acquires from the user 104 biometric information 118 and performs identifications; 5) the user 104 leaves the biometric station 110 and triggers a second beam break 116; and 6) the user 104 optionally rates the biometric station 110 at the satisfaction survey 130.

The group 102 can include users recruited specifically to achieve a demographically diverse gender, age, and ethnicity pool. The beam breaks 114, 116 can be used to establish a transaction time: the amount time each user interacted with biometric station 110 system attempting to acquire an image for each user.

In embodiments, the test facility 106 implements video recording to create a visual record of a user interacting with the test station. In an example, the test facility 106 used video cameras to record video of the overall biometric testing process from a distance, the video being usable to identify overall issues with movement of the general group 102 between and at biometric station(s) for identifying inter-station issues and not just individualized issues for a given user 104 at a given biometric station 110. Such video recording can include facial images of the user 104 for individualized identification purposes. The test facility 106 system may record and provide a video recording, e.g., up to approximately 10 s (ten seconds) of video, per user. The biometric station 110 also may record a video of the user, and may tag and store videos locally at the biometric station 110 during the test session. Video tags can be communicated by the biometric station 110 in real time to the test facility 106, e.g., using an Application Programming Interface (API) and/or backend to allow information/data transfer. Transfer of video data is supported post-test session.

The biometric station 110 can operate systems using a combination of hardware, software, and processes to collect and optionally match biometric information 118 collected from users 104. In an example implementation, the biometric station 110 includes biometrics such as face, iris, or fingerprint biometric systems to meet the requirements of high-throughput identification of travelers within a security checkpoint environment and evaluate system performance through user testing. In another example implementation, the biometric station 110 includes biometrics for evaluating higher-security systems, e.g., security systems that are highly accurate but might perform at a relatively slower rate to achieve the higher accuracy. Thus, the biometric station 110 can collect facial biometric imagery from users to support identification operations. The biometric station 110 can collect and provide at least one facial biometric probe image and at least one iris biometric probe image per user 104. The biometric station 110 in embodiments directs aspects of user interaction needed to obtain the biometric information 118. The biometric station 110 can include an automated mode, to operate in an unmanned mode without an operator/instructor. The biometric station 110 is to collect, process, and submit biometric information within the period of interaction with the user and within defined time constraints. In an example implementation, the biometric station 110 can collect various other types of biometric information, such as finger print, x-ray, backscatter, body scans, and the like technologies for collecting biometric information.

The biometric station 110 can provide a calculated identity per user. Identities can be calculated using a provided image gallery (including a collection of biometric information, such as images, to which biometric information is to be matched), and an onboard matching system as chosen for the biometric station 110. In alternative examples, the biometric station 110 does not include an onboard matching system, because the biometric information acquired by the biometric station 110 is passed to the test facility 106 for backend matching of the biometric information. In some instances, the test facility performs evaluation of the acquisition of the biometric station 110. The biometric image gallery can be provided to each biometric station 110 prior to testing, for use by a given biometric station to perform online matching at the biometric station. In an embodiment, the image gallery contains images for 80%-90% (eighty to ninety percent) of the users that will enter the biometric stations during biometric testing. In example implementations, 10%-20% (ten to twenty percent) of the users are out-of-gallery (e.g., those users will not have a corresponding image contained in the image gallery), and 10%-20% (ten to twenty percent) of the images in the gallery do not correspond to users participating in the test (e.g., those images do not have a corresponding user taking part in the biometric test session). If performing matching operations, a biometric station provides an identification for users entering the biometric station, and a Gallery ID for in-gallery users. The biometric station in embodiments reports out-of-gallery users, based on identifying a given user with a sufficient confidence level (e.g., exceeding an identification threshold) so the biometric station determines that the identified features do not match any images in the gallery. In an implementation, the image gallery contains: representations of 300-400 (three hundred to four hundred) unique persons, approximately 1000-3000 (one thousand to three thousand) facial images and/or hashes that represent individuals in images, and up to 50 MB (fifty megabytes) per image.

Figure 3:
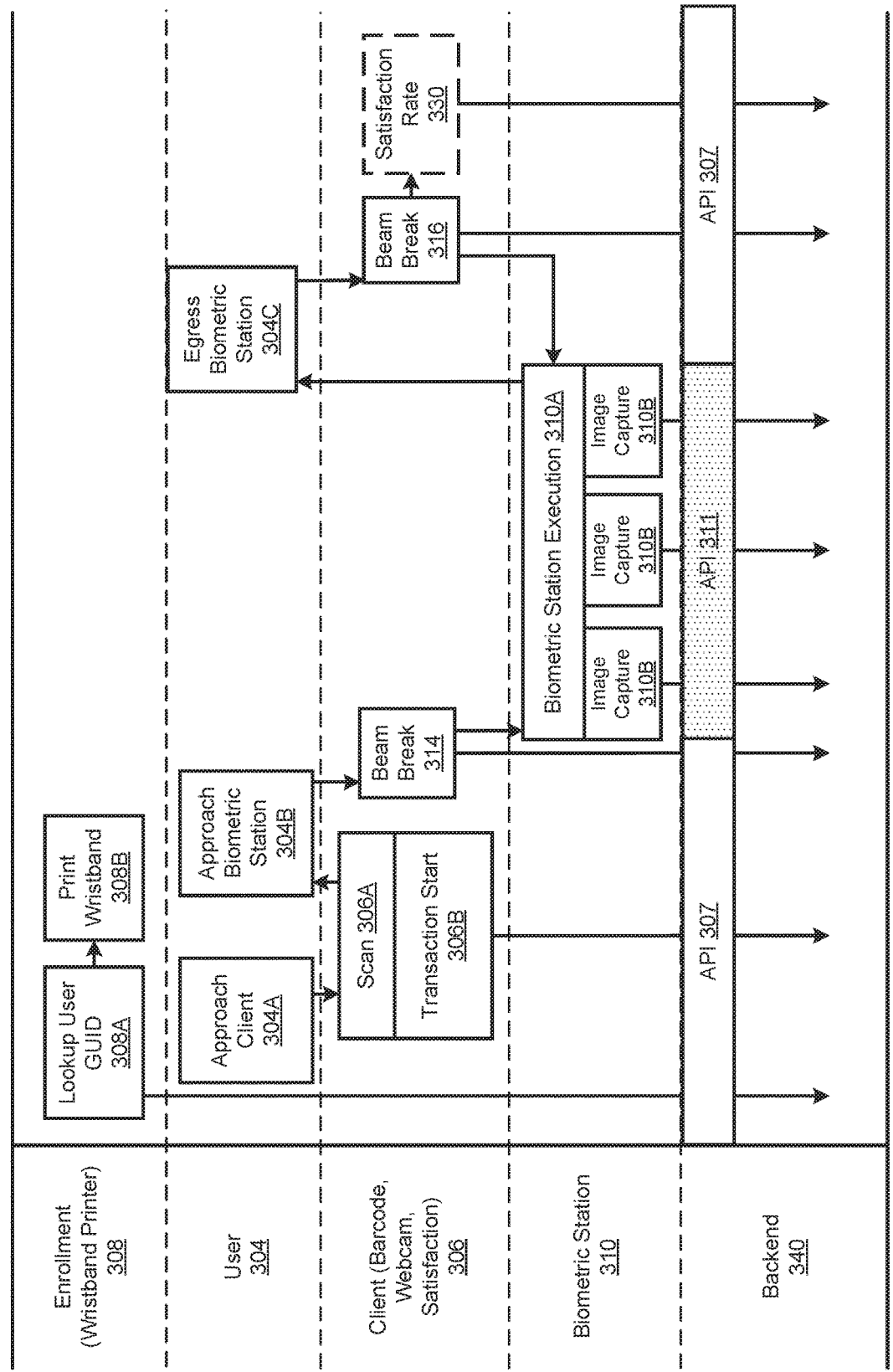
FIG. 3 illustrates workflows and interactions with application programming interfaces (APIs) of a test facility and a biometric station according to an implementation in accordance with this disclosure.

In embodiments, the biometric station 110 analyzes the captured biometric information. In further embodiments, the biometric station passes captured biometric information to the test facility for analysis. For example, the biometric station passes timing information, biometric images, and metadata (identification results, satisfaction scores, etc.) to a test facility backend infrastructure for storage and processing, through an API (see, e.g., API interaction as illustrated in FIG. 3). Accordingly, example embodiments permit flexibility whether the biometric station 110 and/or the test facility store or send timing information. Frontend and backend systems of the test facility can record timestamps associated with beam-breaks, image captures, and identification results for computing such time-related metrics, although the biometric station 110 also can record and store such information. Efficiency of the biometric station 110 can be computed based on this data. Accordingly, the test facility 106 can be set up to prevent a biometric station 110 from accessing such information, so the biometric station 110 efficiency can be determined external to the biometric station 110.

In an implementation, the biometric station 110 submits collected biometric information 118, such as biometric images, to the test facility 106. Images can be formatted and encoded according to specific requirements and stored using backend infrastructure during test execution. Upon completion of testing, the backend can process collected biometric information 118, e.g., via matching algorithms or other analysis approaches as hosted on the test facility's backend infrastructure. For example, the biometric station 110 and/or the backend computes a True Identification Rate (TIR) based on the biometric information 118 captured at the biometric station 110. Various matching algorithms or other forms of analysis can be used by the biometric station 110 and/or test facility, whether at the time of capturing the biometric information 118 or afterward using stored biometric information 118.

An embodiment is configured to evaluate a characterization or quality score for an image, relative to a threshold, corresponding to whether the image includes sufficient information to biometrically characterize a user represented in the image. Biometric information is derived from the image for the user. Based on the biometric information, a biometric characterization of the user is generated relative to a characterization threshold. The system determines whether the biometric characterization matches, to within a matching threshold, a sample image.

In an example, the biometric station 110 performs an on-board capture, identification, video collection, and other biometric information acquisition, without reporting to the test facility 106/backend the steps in such processes. The biometric station 110 can use various facial recognition algorithms for reporting on-board identification results during testing, and the test facility 106 can then use such identification results as provided by the biometric station 110, to permit the test facility to perform further computations (e.g., to perform the TIR) for various biometric stations 110. Biometric information 118, including video recordings, can be stored by the biometric station 110 and/or test facility 106 for future analysis.

In an example implementation, during a biometric information collection exercise session, the biometric station sends the acquired biometric information/data associated with a particular user while the user is within the bounds of the biometric station 110 system area. Information received at the biometric station 110 after the user broke the second beam can be treated as non-relevant to avoid incorrectly associating the data to that particular user. Exceptions for the foregoing include video, which can be transferred at the completion of the data collection session.

A touchpoint/kiosk is positioned external to the second beam break. In embodiments, the kiosk is configured to accept user satisfaction/feedback input. Positioning the kiosk subsequent to the second beam break avoids time associated with use of the touchpoint being attributed to the biometric station. Upon leaving the biometric station 110, a user can input information associated with his/her satisfaction, so user feedback can be tracked. For example, a satisfaction survey 130 presented via a touchpoint allows users to provide feedback for analysis. For example, the satisfaction survey 130 permits evaluation of percent satisfaction and/or how strongly a user holds the satisfaction, which is a proportion of positive satisfaction scores as rated by users following the use of each biometric station 110. In an example implementation, the touchpoint includes four buttons representing self-determined: very happy, happy, unhappy, to very unhappy.

In an implementation, biometric station testing is implemented as a subject randomized block design with full counterbalancing, to balance the order in which biometric stations are visited by different groups/individuals, permitting each biometric station visit to be preceded by every other biometric station visit an equal number of times for multiple group visits.

Figure 2:
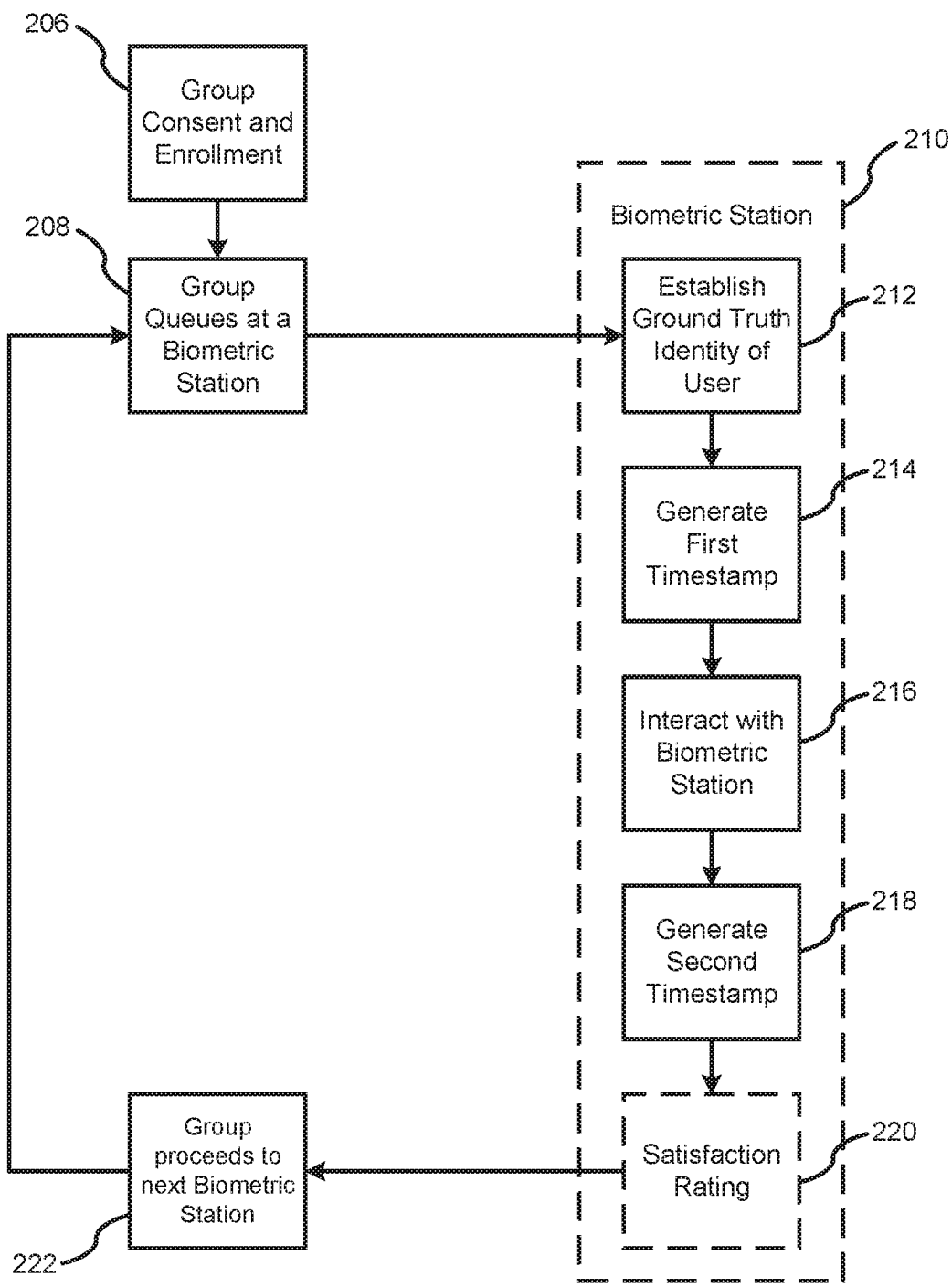
FIG. 2 illustrates group interaction with a biometric station according to an implementation in accordance with this disclosure.

FIG. 2 illustrates group interaction with a biometric station 210 according to an example. The example illustrated in FIG. 2 can be used with the example system illustrated in FIG. 1. In an embodiment, the biometric station 210 is in communication with a backend system, such as a system housed in a test facility. The backend system can issue and track a unique ID for each user. The unique ID can be assigned to a user, e.g., by the user carrying a token or other machine-readable identifier that is associated with the unique ID, such as a scannable 2D barcode worn on a wrist bracelet. The backend system can keep a database correlating the identifiers with their respective unique IDs, and/or the unique IDs can be contained in the identifier and directly readable without a need to cross-reference a database. The identifier/token is readable by an application at the biometric station 210, and is usable to query the backend to receive an indication of the user's assigned unique ID (which can be associated with other IDs, such as a test facility user ID), as well as to access ground truth information for the user. Such ground truth information can be provided by the user during a pre-test user registration, and/or can be provided as part of a gallery of biometric and/or biographic user information. Tokens or other ground-truth identifiers carried by the user can include user-readable features, to designate functionality separate from ground-truth verification. For example, wrist-worn identifiers can be color-coded corresponding to a group to which the user is assigned, without revealing to users any ground truth identifying information about that user. Similarly, the identifier can be encoded such that the user and/or the biometric station can see the unique encoded information (e.g., a generic serial number or barcode), while being prevented from knowing the associated ground truth information. Accordingly, testing ensures that the biometric station is performing a blind test for biometric acquisition and/or identification.

In an embodiment, the backend system can collect from the users a set of biometric samples (finger, face, and iris information) as baseline biometric information (such as images) corresponding to the users, to be used as ground truth reference information in post-collection matching and verification. The backend associates the baseline imagery to the user, via ground truth scan of the user-carried identifier (e.g., machine readable information on a wristband, such as a barcode or the like) for permitting a machine to read or access information for analysis. The group queues (208) at a biometric station 210. For example, multiple user groups queue at individual biometric stations substantially simultaneously to simulate collection scenarios.

The users respectively interact with the biometric station 210. The ground truth identity of the user is established (212). For example, an optical scanner is implemented to scan a barcode of a queued user's wristband to establish ground truth identity. A first timestamp is generated (214). For example, an optical beam-break is implemented to initiate timing. In an example, scanning a user's wristband serves as a first timestamp, and is optionally scanned upon exiting the biometric station to serve as the second timestamp.

The user interacts with the biometric station (216). For example, the user interacts with the biometric station according to instructions provided by the station, e.g., visual instructions output on a display and/or audible instructions output via a speaker. The test facility can place constraints on the biometric stations, such as imposing the constraint that interaction duration will be time-limited to 20 s (twenty seconds). During this time, the biometric station can communicate the result of biometric capture/identification operations to the backend for evaluation via the API. In an example, the biometric station communicates to the backend one or more faces, pairs of irises, and identification results per transaction.

A second timestamp is generated (218). For example, a beam-break (e.g., second beam break) triggers terminating timing commenced responsive to the first beam break. A satisfaction rating is received (220). For example, once a user exits the biometric station space, he/she presses one of four buttons to indicate his/her individual impression of the biometric station via a kiosk.

Blocks 212-220 are repeated (iterated) for each user until the group has completed that biometric station, or a maximum group time limit is reached. In an example, information collected during a dry run is used as a group time limit threshold for trial collection. The group proceeds to the next biometric station (222). The procedure illustrated in FIG. 2 can be repeated for each biometric station in the test facility.

Groups and/or individual users can be directed to the various different biometric stations to achieve statistical counterbalancing for treating each biometric station equally. For example, a Latin square approach is used to balance the order in which biometric stations are visited by different groups/individuals, serving as a between-subjects counterbalancing factor. More specifically, a first-order balanced Latin Square design (e.g., for n total biometric stations visited by user groups) ensures that each biometric station collection is preceded by every other biometric station collection an equal number of times.

Group size can be chosen to provide sufficient statistical properties on key measures, such as timing, biometric identification accuracy, and user satisfaction information. Collecting such biometric measurements with sufficient group/user size enables different types of statistical tests to be performed on the biometric measurement information. For example, effectiveness of the acquisition and/or content of biometric information is determined based on a comparison of two proportions through a two-sample, two-sided proportion test (e.g., does the biometric station's system have a failure to acquire (FtAR) rate matching, exceeding, or below a given threshold). Efficiency of the acquisition and/or content of biometric information can be determined based on a comparison of two or more means through a paired two-sample, two-sided t-test (e.g., is one biometric station faster than another). In an implementation, a sample group size of 300 (three hundred) in-gallery users, with an additionally artificially created 30 (thirty) out-of-gallery users (330 (three hundred thirty-three) total group size) provides sufficient statistical robustness and user demographic diversity for testing a plurality of biometric stations within the test facility. To maximize statistical performance, biometric system metrics can be compared across all blocked factors as within-subject effects (i.e. each system will collect biometrics from all subjects). Biometric systems can be evaluated relative to one another or against threshold metric levels. The differences of these comparisons can depend on sample size and specific assumptions.

FIG. 3 illustrates workflows and interactions with application programming interfaces (APIs) 307, 311 of a test facility 306 and a biometric station 310 according to an example implementation. Generally, an Application Programming Interface (API) as used herein is a set of defined methods for communicating between biometric station 310 and the test facility's backend, e.g., information storage and processing systems. An API can be provided as a RESTful, HTTP-based API to facilitate biometric testing interactions. The test facility backend 340 can make available its API to the various biometric stations. Biometric stations are configured to identify and/or communicate the API server address and their Station ID to access the API.

As illustrated, at test facility enrollment 308, a lookup is performed for a user GUID 308A, by accessing the API 307. A token (e.g., wristband 308B) closely associated with a user is generated to encode the user GUID, e.g., as a two-dimensional barcode worn by the user as a wristband, which serves as a ground-truth identity for the user. The ground-truth identity is usable to independently verify whether a biometric identification is accurate.

Such functionality can be provided by the test facility backend 340 via the API 307 as part of one or more application(s). More specifically, the backend supports biometric test sessions according to the following. A machine readable token that is closely associated with an individual is provided to the user for relating images (reference and captured during testing) to the individual via the token. Baseline biometric imagery (facial, iris, fingerprint) is captured for use as a basis for comparison. A scan is performed of the token to associate collected biometric information with a ground truth identity assigned to the applicable user. For example, an optical laser scanner is used to scan a barcode included on a wristband that is at least semi-permanently attached to a user. In this manner, the identity reflected in or by the wristband is used to conclusively relate captured images with the identity to assess system performance, e.g., biometric station performance. In embodiments, a backend is configured to receive information from the enrollment and transaction applications as well as from the biometric stations.

The backend 340 can receive and respond to a variety of messages including, but not limited to: SubjectLookUp, which looks up the identity of a subject; StartTransaction, which creates a transaction at a biometric station; Beam-Break, which records a beam break associated with a transaction; ImageCapture (Face/Iris/fingerprint), which associates an image with a transaction; IdentificationResult, which associates a user identification with a transaction; Video-Link, which takes a video link object from user and associates it with a transaction; and SatisfactionRate, which accepts a satisfaction rating. Additionally, along with the POST image capture events, the API can accept and deliver an assumed identity based upon a match score ranking calculated by the internal matching scheme of the biometric station's system.

In an example implementation, the API is configured to accept from a biometric station biometric information output, including but not limited to: at least one facial biometric probe image per user; up to three face biometric images per user; an iris image per user; provided identifications using a reference gallery; and video of users that are unique to that image capture event. For example, a video file is tagged with a unique identifier that is not repeated. The API can be configured so API calls beyond a predetermined threshold are ignored to avoid erroneous reporting by a station.

The user 304 approaches the test facility client at 304A. The test facility client 306 performs scan 306A, associated with a transaction start 306B, which is communicated to backend 340 via the API 307. The backend can include collective information storage and processing systems that are accessible by biometric stations. The user 304 then approaches the biometric station at 304B, and triggers a first beam break 314 upon entry to the biometric station 310. The first beam break 314 creates a first timestamp, communicated to the test facility private API 307 and the biometric station 310.

The biometric station 310 following the first beam break 314, performs a biometric station execution 310A, involving collection of biometric information such as image captures 310B. The biometric information is passed to the biometric station API 311. The biometric station 310 can communicate additional metrics to the biometric station API 311 or the API 307 (e.g. the API implemented by the backend), such as performance criteria including acquisition and/or quality metrics. The biometric station API 311 also can communicate with the API 307.

On station startup, the station configures an HTTP Endpoint to send/receive messages to/from the backend, which can include an IP address and port on the test facility local network, along with a unique station ID. A biometric station will include the station ID as part of each HTTP request to the API 307.

The Station ID will serve to identify information from a particular station, and will give the station access to the API 307 to communicate data/information. For those biometric stations performing on-board biometric matching, the backend 340 is to provide to that biometric station a gallery of images to match against.

Following biometric station execution 310A, the user 304 egresses the station 304C, and triggers a second beam break 316 to generate a second timestamp that is communicated to the API 307 and/or to the biometric station 310.

After the second beam break 316, responsive to user input, a satisfaction rating is communicated by for example a kiosk to the backend using the API.

Figure 4:
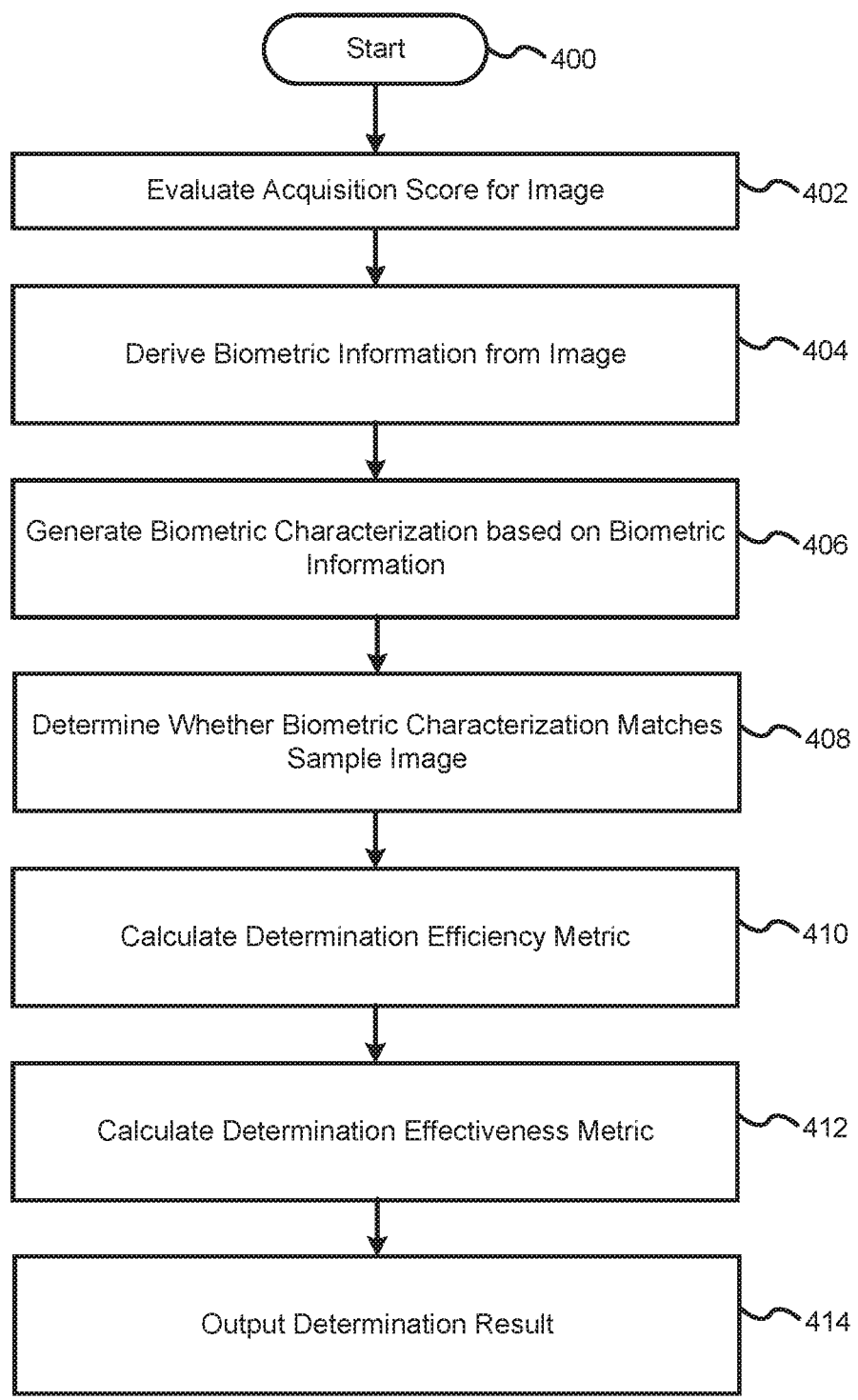
FIG. 4 illustrates an example flowchart to calculate biometric determination efficiency and biometric determination effectiveness according to an implementation in accordance with this disclosure.

FIG. 4 illustrates methods consistent with the present disclosure. The methods are illustrated in flowchart form and are useable to calculate biometric determination efficiency and biometric determination effectiveness according to an example implementation. An acquisition score for an image is evaluated (402). In an embodiment, a backend system and/or a biometric station identifies, relative to an acquisition threshold to be met, whether an acquired image includes sufficient information to biometrically characterize a user represented in the image. The backend and/or station determines whether the biometric information meets the threshold for quality based on an image quality algorithm to determine if an image is sufficiently sharp, has acceptable contrast, meets a hue standard (e.g., color is accurate to a standard (RGB standard)), and other determinations to identify whether an image is suitable for use.

Biometric information for the user is derived from the image (404). Biometric identification algorithms can implement a variety of approaches for deriving biometric information, such as calculating or otherwise processing information, which can be used to generate a signature that is indicative of and which results in a biometric characterization of the underlying biometric information. For example, the facial recognition algorithm derives a biometric signature of a person's face from the information comprising the image such as by extracting information of features that can be used for identification. In embodiments, a biometric signature is information that maps biometrically identifiable features. The facial recognition algorithm, for instance, can map facial features including relationships between features in order to develop a biometric signature of the individual's face. Example features include, but are not limited to, eyes, nose, skin, ears, mouth, facial features (moles, freckles). Other features include facial hair (e.g., hair patterns), skin wrinkles, eyelids, mouth shape, hand geometry, signature, voice, and lips. Example algorithms include, but are not limited to principle component algorithms, Eigenface based algorithms, algorithms using elastic matching, and algorithms employing linear discriminant analysis. Additional algorithms include Fisherface based algorithms, hidden Markov model based algorithms, and multilinear subspace learning algorithms. In some embodiments, combinations of algorithms and approaches can be used.

Based on the biometric information, the system can generate a biometric characterization of the user (406), e.g., relative to a characterization threshold. In an embodiment, in addition to the algorithms mentioned above, other algorithms based on pattern recognition can be used. Similar to the discussion regarding facial recognition and generating facial signatures, a fingerprint algorithm can generate a signature, sometimes referred to as a template, which represents the fingerprint represented in the image, the captured fingerprint. While a biometric signature is obtained for the fingerprint, it should be evident that the underlying image, e.g., an image of the fingerprint, can be maintained for use. A fingerprint image, similar to that of other images discussed herein, can be maintained in a variety of formats, including but not limited to: jpeg, tiff, gif, pdf, rif, png, ppm, bpg, cgm, svg, and rs-274x.

In addition to algorithmic output, additional information can be provided as well. For example, a computing system performing the method may include metadata that is associated with the biometric information, e.g., the biometric signature of the individual's face represented by the image. Example metadata includes information that uniquely identifies the image, date, time, software version, what software was used, error checking results, physical device information, location, timestamp, vendor information, biometric information, image information, use input information (such as observations from an official overseeing enrollment) and so forth.

The biometric characterization of the user can be based on genericizing biometric information. Genericizing can involve making, such as by converting, the information into a format that is agnostic of way in which the information was obtained. Genericizing, for example, includes converting a facial recognition signature into a format that is not indicative of the algorithm used to obtain the information comprising the signature in the non-generic form.

An example of non-generic information is biometric data that indicates or is reflective of the use of, for example, a proprietary algorithm to obtain or process the information. In an embodiment, the system converts biometric information obtained through use of a particular type of algorithm, such as a proprietary algorithm, into a format that complies with a predetermined standard that is generic or agnostic of the particular algorithm and/or information capture system used to obtain the information. In some instances, genericizing includes discarding information beyond that to be reflected in the generic dataset. In other examples, genericizing includes translating biometric information to a form that is generic from that of the algorithm and/or information capture used to obtain the information. The American National Standard for Information Systems' standards are examples. Information may be compliant with one or more of NISTIR 6529-A, ANSI/NIST-ITL 1-2000 (for exchange of facial, fingerprint, scar, and tattoo information), ANSI/INCITS 358-2002, standards promulgated by International Committee for Information biometrics committee (M1), INCITS 377, ANSI INCITS 377-2004, ANSI INCITS 378-2004 (Finger Minutiae Format for Data Interchange), or the like standards for exchanging biometric information.

In embodiments, genericized information is hashed, e.g., subject to or has a hash function applied to it. In some instances, multiple hash functions are used for various purposes. Example purposes and by extension hash functions include, but are not limited to, mapping information and encrypting the information for communication and/or storage. Although biometric information hashing will be primarily discussed, biometric information or a combination of biometric and biographic information can be hashed as appropriate. A hash can be used to map biometric information captured in, for example, an electronic fingerprint image to generate a hash code that is indicative of the image.

Referring back to FIG. 4, it is determined whether the biometric characterization matches a sample image (408). For example, the system can check for a match within a matching threshold, by matching the acquired image against a gallery of sample images. Matching can be performed using a variety of biographic and biometric information to determine whether information obtained at a point in time subsequent to enrollment matches or is excluded (non-match) from that obtained at a previous point in time, e.g., ground truth biometric information, also referred to as historic biometric information.

For example, a system compares information for a fingerprint captured at a biometric station with a fingerprint provided during enrollment that is asserted to match, such as based on biographic information, or input manually. While matching can be done by comparing all or substantially all of the biometric information captured during enrollment, as discussed above a subset of the information or information derived from the biographic information (e.g., output of a biometric algorithm) can be used for matching. Optional selection of what biometric information is to be used as a basis for matching can be used to down select what historical biometric information to which the currently captured information is to be compared. In the preceding example, a badge number for the individual is used to locate historical fingerprint information in a lookup table stored in local memory. In the preceding example, the historical fingerprint information is prepositioned with the access control device to speed access in comparison to retrieving the information responsive to receipt of the badge number, although this too is possible if for example the system did not predict (via an algorithm based on historical access information) the individual would request access.

Such comparisons are iterated until yielding a pass or until: the occurrence of an event, for a set number of iterations, or a predetermined period of time, e.g., iterate for 30 (thirty) seconds. The foregoing presumes the comparison is not met during the specified period or the criterion is not met. In this instance, the comparison "fails" and corresponding processes triggered, e.g., alert user, deny passage (through electronic gate), capture additional biometric information, issue a "fail receipt," provide a visual indicator, direct the in-question individual according to a fail determination, a fail record is created in memory and is promulgated with biometric/biographic information from the event, combinations thereof, and so forth. The foregoing is done responsive to a determination that the comparison is a "fail" and a system/device can be programmed to trigger a variety of responses.

An affirmative or pass outcome is representative of the comparison indicating the biometric information for the in-question individual matches historic biometric information as designated by biographic information, e.g., a provided passport number. Responsive to this determination, the system performing the method can execute a variety of procedures.

Setting a match threshold is representative of a system/device that performs the method designating a level that the biographic information for the in-question individual has to match historic biometric information (e.g., enrollment information) in order to pass. For example setting a match threshold designates a level of similarity that is indicative of the currently obtained information being the same or substantially similar to enrollment information.

The match threshold can be predetermined based on a criterion. The threshold level can be set manually, such as for a heightened security level, or may be adaptively determined by the algorithm based on one or more criterion that are intrinsic, extrinsic, or a combination thereof criterion, e.g., including intrinsic and extrinsic. In the case of a manual threshold, the predetermined criterion is the user's selection. Example intrinsic criterion include, but are not limited to, date of last transaction, date since enrollment, biometric information quality, lack of biometric information (e.g., missing fingerprint information), age, travel plans, biographic information, time, and so forth. Example extrinsic criterion include: threat status, information from other screenings (e.g., an increase level of low quality matches or low quality biometric information from other matches), number of screenings, wait times, and so forth. While a system/device performing the method can dynamically change the threshold, in some instances the system/device implements a floor or minimum acceptable threshold that limits the lowest acceptable match. While individuals can be screened at a higher threshold, the minimum acceptable level sets the lowest match level that can be used, e.g., the threshold level for individuals with the lowest risk, whether real, calculated such as based on biographic information, or anticipated.

A threshold for non-matching may be set to a lower level than that of matching, e.g., a fifty percent (50%) non-match yields an affirmative exclusion while affirmative matching is done to a higher level of correspondence or similarity. In other examples, such comparison is based on less biometric information than that used for affirmative matching. For example, a subset of fingerprint information, such as information that is highly indicative or substantially highly indicative of the overall fingerprint, is used to speed the comparison based on the other biometric information.

An efficiency metric of the determination is calculated (410). In an example implementation, efficiency comparisons will focus on average transaction times and comparisons of two average transaction times will be performed using a paired t-test. The standard deviation of the paired differences, for a group size of approximately 330, is expected to be below five seconds for a ten second average transaction time.

Efficiency in embodiments refers to a transaction time associated with a biometric station user event including, but not limited to, acquiring, identifying, or otherwise interacting with the user to obtain and/or analyze the user's biometric information. Transaction time is the average time the biometric station system spends interacting with a user, inclusive of instructions, and potentially multiple capture attempts, resulting in a biometric outcome, including failure to collect or identify.

In some example implementations, the user interactions with a station are quantified using the following symbols and equations. Biometric transactions (T) are sorted into different groups (T*) based on whether they have image capture times $\delta_{IC}$ failing within different time windows ($\delta^* \in \{5\text{ s}, 10\text{ s}, 20\text{ s}\}$) according to $\delta_{IC} < \delta^*$. Standard biometric effectiveness metrics will be calculated for each subset of transactions. A biometric station may provide multiple biometric images. However, the last biometric capture ($IC_{last}$) within interval $\delta_{IC} < \delta^*$ will be used to measure effectiveness for a transaction. A biometric station can determine whether additional images will improve biometric performance.

Different aspects of the biometric testing session enable the biometric stations to meet various threshold values. The thresholds and objectives, along with definitions of each measure, are listed in the following Table 1.

TABLE 1

| | Face/Iris Metrics | | |
|---|---|---|---|
| Measure | Description | Threshold | Objective |
| Avg. Transaction Time $\hat{\delta}_T$ | The time users spent using the system (entrance to exit). Calculated as the difference between the exit beam break time ($t_{BB2}$) and entry beam break times ($t_{BB1}$). $$\hat{\delta}_T = \frac{\sum [t_{BB2} - t_{BB1}]}{\sum [T]}$$ | 10 seconds | 5 seconds |
| Image Capture Time $\delta_{IC}$ | The latency of each image capture (IC). Calculated as the difference between image capture time ($t_{IC}$) and entry beam break time ($t_{BB1}$). $\delta_{IC} = t_{IC} - t_{BB1}$ | NA | NA |
| Failure to acquire rate FtAR* | Percentage of transactions that result in a failure to acquire or process image captures $IC_{last}$ within the time interval $\delta^*$. $$FtAR^* = 100 \times \frac{\sum [T^* \in [IC_{last} = 0]]}{\sum [T]}$$ Image capture $IC_{last} = 0$ refers to the case when no image captures are obtained or the last obtained capture does not result in a biometric template generation by test facility algorithms.[1] | <5% @ $\delta^* = 20$ s | <5% @ $\delta^* = 5$ s <1% @ $\delta^* = 20$ s |
| True identification rate tTIR* | Percentage of transactions that result in a correct identity ($I_M$) within time interval $\delta^*$ as calculated by the test facility matching engine relative to ground truth identity $I_{GT}$. $$tTIR^* = 100 \times \frac{\sum [T^* \in [I_M(IC_{last}) = I_{GT}]]}{\sum [T]}$$ Here image capture $IC_{last}$ refers to the last image capture obtained within interval $\delta^*$. | >95% @ $\delta^* = 20$ s | >95% @ $\delta^* = 5$ s >99% @ $\delta^* = 20$ s |
| Biometric Station true identification rate bTIR* | Percentage of transactions that result in a correct biometric station-reported identity ($I_{V,last}$) relative to ground truth identity $I_{GT}$ reported within the interval $\delta^*$. $$bTIR^* = 100 \times \frac{\sum [T^* \in [I_{V,last} = I_{GT}]]}{\sum [T]}$$ | >95% @ $\delta^* = 20$ s | >95% @ $\delta^* = 5$ s >99% @ $\delta^* = 20$ s |
| Percent Satisfaction $S_{positive}$ | Proportion of positive satisfaction scores as rated by users immediately following station use. Ratings will be provided as 1 = "Very Unhappy", 2 = "Unhappy", 3 = "Happy", 4 = "Very Happy". $$S_{positive} = 100 \times \frac{\sum [S \geq 3]}{\sum [T]}$$ | 90% | 95% |

[1] Note that if half of the transactions have a capture in the interval $\delta^*$, then the minimum value of FtAR* is 50% (fifty percent).

An effectiveness metric of the determination is calculated (412). In an example implementation, effectiveness comparisons will be two-tailed comparisons of proportions made against a threshold metric level of 0.95 (zero point nine five) for TIR metrics and against 0.05 (zero point zero five) for FtAR. For a sample size of 330 (three hundred thirty) subjects, a system with a true TIR of 98.3% (ninety-eight point three percent) or higher will be reliably classified as exceeding the 95% (ninety-five percent) threshold metric level while a system with a true TIR of 91.8% (ninety-one point eight) or lower will be reliably classified as falling short. Systems with TIR between 91.8% (ninety-one point eight) and 98.3% (ninety-eight point three) will be statistically consistent with the threshold level. Narrowing this band by a factor of 2 (two) requires sample size to increase by a factor of approximately 3 (three) to approximately 1000 (one thousand) subjects.

A result of the determination is output (414). This can involve storing the determination on a backend (e.g., server or cloud based system), and/or displaying the results at a control center of the test facility. A biometric station also can store the determination output at the biometric station. As noted above in Table 1 (compare tTIR vs bTIR), the test facility and/or the biometric station can perform their own quantifications of the biometric information.

Figure 5:
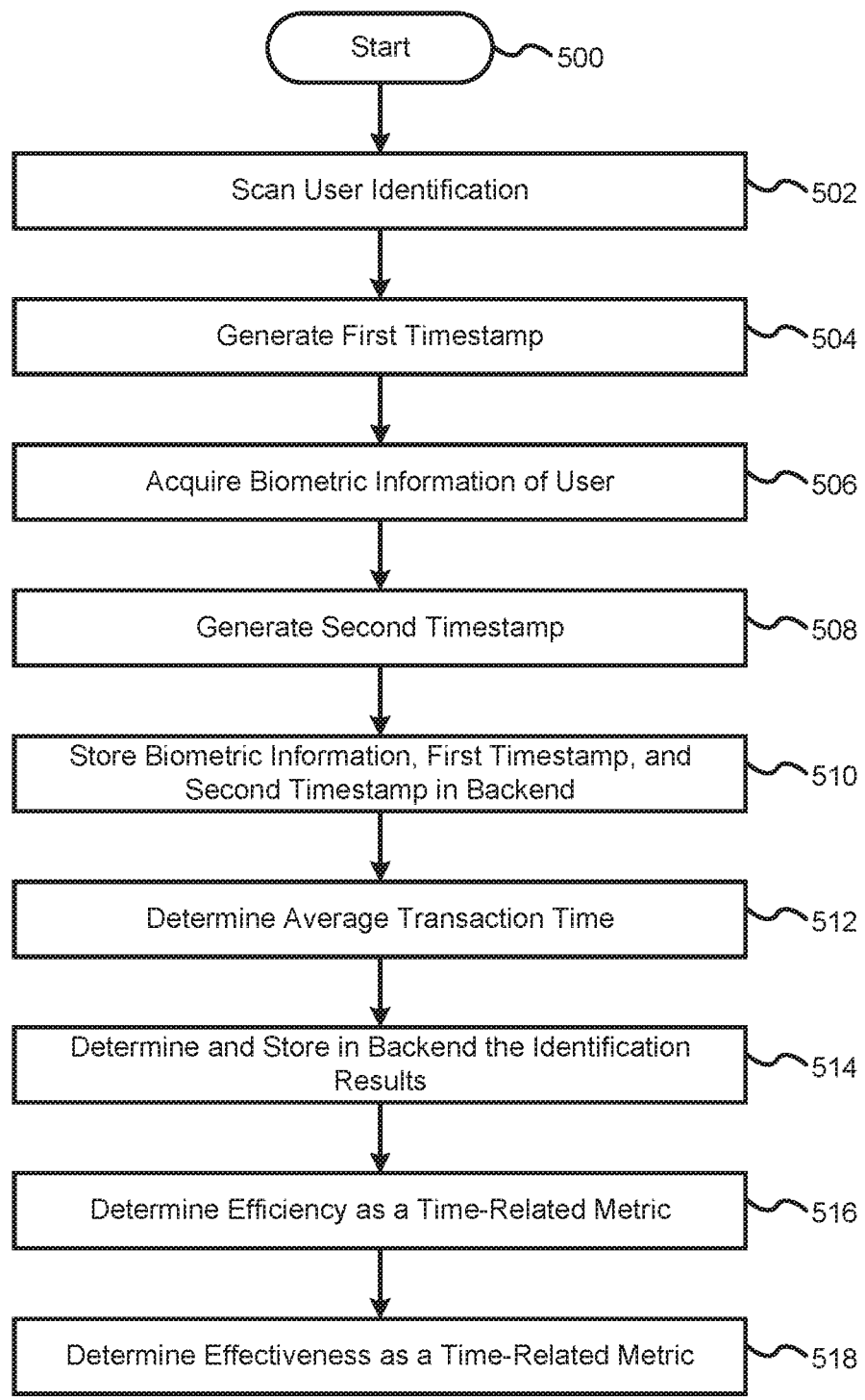
FIG. 5 illustrates an example flowchart to determine efficiency and effectiveness as time-related metrics according to an implementation in accordance with this disclosure.

FIG. 5 illustrates an example flowchart to determine efficiency and effectiveness as time-related metrics according to an example implementation. A user identification of the user is scanned (502). The use identification can be used to establish a ground truth identity of the user. In an example implementation, the user identification can be a wrist-worn two-dimensional barcode.

A first timestamp is generated (504). The first timestamp can be generated responsive to starting to acquire biometric information of the user at the biometric station. In an example implementation, the first timestamp can be generated upon a user breaking a first/entry sensing beam upon crossing a threshold entrance to a biometric station at which biometric information will be acquired.

Biometric information of the user is acquired (506). Such biometric information can include photographs, x-rays, infrared, and other forms of active and passive scanning to collect biometric information.

A second timestamp is generated (508). The second timestamp can be generated responsive to completing the biometric information acquisition. In an example implementation, the second timestamp is generated responsive to a user breaking a second/exit sensing beam upon crossing a threshold exit from a biometric station at which biometric information has been acquired.

The biometric information, the first timestamp, and the second timestamp are stored in a backend (510). For example, the information collected by the biometric station is transferred from the biometric station to a backend through the use of one or more APIs.

An average transaction time for biometric acquisition and/or identification of the user is determined (512). In an example implementation, the average transaction time is the average amount of time the user's in a group or those interacting with the station spent using the applicable system, and can be expressed in terms of an average among multiple users. The average transaction time can be based on a difference between the first timestamp and the second timestamp for a given user, averaged across multiple users in a group.

Identification results associated with the biometric information are determined and stored for example by the backend (514). The identification results can be based on determinations related to acquisition speed of a biometric image, failure to acquire a biometric image (FtAR) relative to an FtAR threshold, failure to extract biometric information from an image (FtPR) relative to an FtPR threshold, failure to perform a biometric match (FtMR) relative to an FtMR threshold, a True Identification Rate (TIR) as a percentage of correct identifications within the time interval between the first timestamp and the second timestamp, biometric station True Identification Rate (bTIR): percentage of transactions that result in a correct vendor-reported identity relative to the ground truth identity reported within a given time interval, and others (see table 1 for more details).

In embodiments, the Failure to Acquire Rate (FtAR) is the percentage of transactions that result in a failure to acquire or process image captures within a given time interval. The True Identification Rate (TIR) is a percentage of transactions that result in a correct identification in accordance with the applicable ground truth identity in a given time interval.

Efficiency is determined as a time-related metric (516). For example the first and second timestamps are used to determine a total time that is used for analyzing efficiency relative to time. In an example implementation, a server functioning as a backend can compare two or more arithmetic means of identification results according to a two-sample, two-sided t-test, to determine the efficiency.

Effectiveness is determined as a time-related metric (518), e.g., based on the first timestamp and the second timestamp. In an example implementation, the test facility system/backend can compare two or more proportions of identification results according to a two-sample, two-sided proportion test, to determine effectiveness.

While a number of exemplary implementations are described, it should be appreciated that the present disclosure provides many applicable inventive concepts that can be embodied in a wide variety of ways. The exemplary implementations discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art. Any headers used are for convenience and should not be taken as limiting or restricting.

Conclusion

Certain attributes, functions, steps of methods, or sub-steps of methods described herein are associate with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, the teachings and disclosures herein can be combined, rearranged, with other portions of this disclosure and the knowledge of one of ordinary skill in the art. It is the intention of this disclosure to encompass and include such variation.

What is claimed is:

1. A system, comprising:
    a controller implemented by a processor, and a biometric station with one or more sensors and a scanner;
    the biometric station having an entry point and an exit point, the entry point and the exit point accommodating a passage of each subject of a plurality of subjects;
    the scanner being configured to acquire respective biometric information of said each subject during the passage;
    the one or more sensors being configured to determine a respective time duration of said passage of said each subject, thereby providing a plurality of time durations; and
    the controller being configured to:
        determine a respective biometric characterization of said each subject based on the respective biometric information;
        identify a respective match, for the respective biometric characterization of said each subject, from a set of biometric characterizations pertaining to the plurality of subjects, thereby providing a plurality of matches; and
        determine, based on the plurality of time durations and on the plurality of matches:
            an efficiency metric computed according to a t-test; and
            an effectiveness metric computed according to a proportion test.

2. The system according to claim 1, wherein the biometric station further comprises a prompter configured to output a cue to said each subject to complete the passage.

3. The system according to claim 1, wherein the controller is configured to calculate an acquisition speed of the respective biometric information.

4. The system according to claim 1, wherein the respective biometric information comprises one of a facial image, an iris scan, and a fingerprint scan.

5. The system according to claim 1, further comprising:
    a second biometric station comprising one or more second sensors and a second scanner, the biometric station and the second biometric station being a plurality of biometric stations; and
    the controller determining the efficiency metric and the effectiveness metric for each of the plurality of biometric stations.

6. The system according to claim 5, wherein the plurality of biometric stations are arranged in serial to accommodate the passage of the same plurality of subjects.

* * * * *